Feb. 13, 1951  M. J. WILCOX  2,541,801
STRIPPING OF OIL FROM SPENT CRACKING CATALYST
Filed April 30, 1947
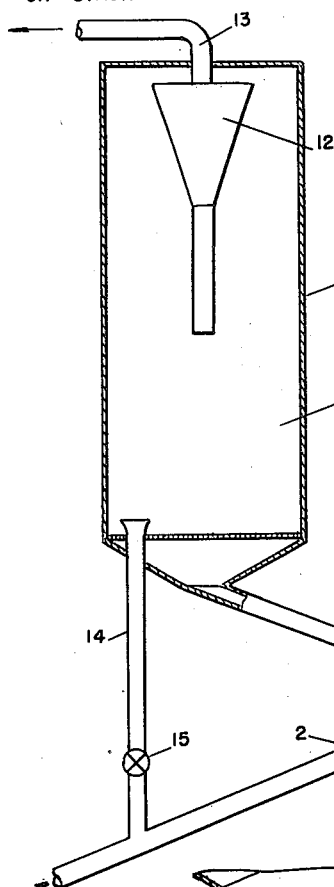
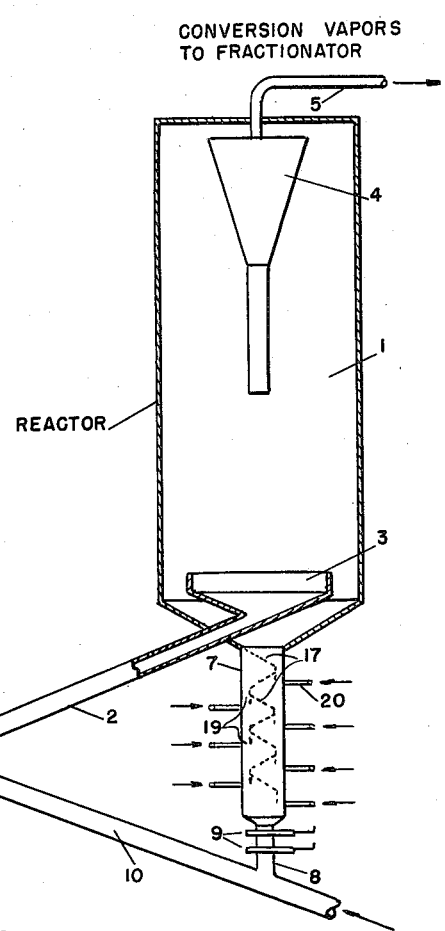
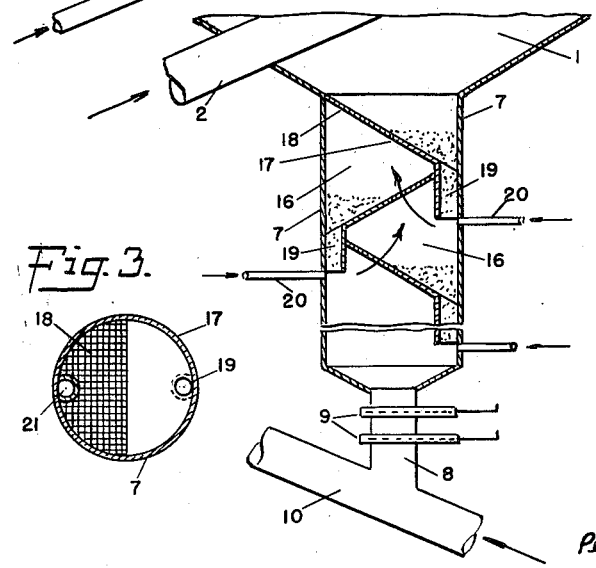
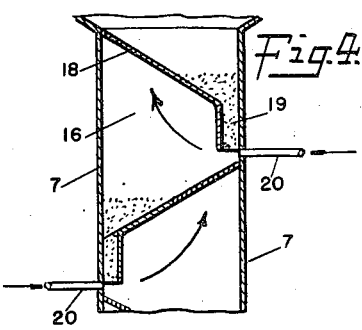
INVENTOR
MARION JAMES WILCOX
BY
Pennie, Edmonds, Morton & Barrows
ATTORNEYS Patented Feb. 13, 1951

2,541,801

UNITED STATES PATENT OFFICE 2,541,801

STRIPPING OF OIL FROM SPENT CRACKING CATALYST

Marion J. Wilcox, Harvey, Ill., assignor to Sinclair Refining Company, New York, N. Y., a corporation of Maine Application April 30, 1947, Serial No. 745,035

7 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst at elevated temperature is suspended in oil vapors, passed to a reactor in which conversion of the oil occurs, and in which the spent catalyst is separated from the oil vapors, the separated catalyst stripped of oil, regenerated by burning off coke or carbon deposited thereon and the regenerated catalyst again suspended in the stream of oil vapors passing to the reactor. Operations of the type described are commonly designated fluid catalyst processes.

In operations of this type, the spent catalyst, withdrawn from the reaction zone, carries with it a substantial amount of hydrocarbons. It is important that these hydrocarbons be removed from the catalyst before the catalyst is passed to the regenerating step for the reason that the hydrocarbons are of substantial value and, further, in order to hold to a minimum the amount of combustible material to be consumed in the regenerating step. The latter reduces the difficulties experienced in avoiding excessive temperatures in the regeneration.

The present invention provides improvements in fluid catalyst conversion processes, both with respect to recovery of hydrocarbons absorbed in the spent catalyst, and the amount of combustion required in the regeneration. The invention further provides an improved method and improved apparatus whereby the stripping of the hydrocarbons from the catalyst is advantageously accomplished.

In accordance with my invention, I strip the spent catalyst by subjecting it to a plurality of successive stages in which the catalyst is repeatedly suspended in the stripping medium, advantageously steam, precipitated from the medium and resuspended in a further, fresh portion of the stripping medium. This is, with advantage, accomplished by passing the spent catalyst from the reaction zone downwardly through an enclosed, vertical elongated stripping column, composed of a plurality of successive, communicating zones formed by inclined partitions, perforated at their respective upper end and terminating at their respective lower end in a standpipe through which precipitated catalyst passes downwardly from an upper zone to a lower zone. As the catalyst passes from the lower end of the respective standpipes, it is resuspended in a stream of gaseous stripping medium, steam, for instance, and a portion of the catalyst is carried by the steam upwardly through the perforations in the partition and reprecipitated in a higher zone. Thus, fresh steam, for instance, is introduced into each of the zones and blown at relatively high pressure and high velocity across the lower ends of the respective standpipes, sweeping the downcoming catalyst along with it and forming an effective seal for the lower end of the standpipes. The pressure of the steam is reduced, somewhat, in passing through the perforations of the inclined partition and the catalyst drops out of suspension, partially in the higher zone from which it came and partially in the next lower zone.

A series of these zones, such as described, provides adequate stripping for the catalyst and reduces the pressure built up in the reactor standpipe. This is an important advantage since it reduces the wear on the valve arrangement for controlling the passage of catalyst from the bottom of the reactor without reducing the height of the catalyst bed in the reactor. The optimum steam pressure will vary with other operating conditions.

The present invention provides an improved process, adapted to continuous operation and comprising a plurality of cooperating steps so coordinated as to constitute a unitary operation in which a charge of catalyst is repeatedly used and intermittently regenerated and returned to the cracking zone with increased catalyst activity and length of life and conservation of valuable hydrocarbons.

Other advantages derived from my invention will appear from the following detailed description of its application to a fluid catalyst cracking operation with reference to the accompanying drawings of which Fig. 1 represents, conventionally and diagrammatically, a flow diagram of the operation;

Fig. 2 is an enlarged fragmentary sectional elevation, showing in greater detail one form of my improved stripper;

Fig. 3 is a plan view of the partitioning members of the stripper; and

Fig. 4 is an enlarged fragmentary sectional elevation of a modification of my stripper.

Referring more particularly to Fig. 1 of the drawings, the apparatus indicated by the reference numeral 1 represents a generally cylindrical reactor, of conventional type. The finely divided catalyst suspended in oil vapors enters the reactor through conduit 2, extending into the reactor and terminating in a conical member 3 of somewhat smaller diameter than the reactor and opening into the reactor through a conventional grid. As the hot oil vapors pass upwardly through the reactor, there is a tendency of the catalyst to drop out of suspension forming a so-called "high density" or "dense phase" fluidized body of catalyst in the reactor which flows downwardly through the annular space between the member 3 and the walls of the reactor.

Oil vapors, product of the conversion, rise to the top of the reactor, pass through a cyclone type separator 4, to remove suspended catalyst from the vapors, the latter passing therefrom through conduit 5 to fractionating apparatus, not shown, and the separated catalyst dropping back into the dense phase body of catalyst in the reactor.

Spent catalyst flows from the bottom of the reactor into the top of the stripping column 7, more fully hereinafter described, and flows therefrom through conduit 8, in which there is interposed the double slide valve 9 of conventional type for controlling the flow of the catalyst. From thence, the spent catalyst flows into conduit 10, where it is picked up by a current of air, or other oxidizing gases, and carried up into the bottom of the regenerator 11 of conventional type.

In passing upwardly through the regenerator in contact with the air, or other oxidizing gas, the carbon deposited on the catalyst is burned off. The resultant flue gases pass from the top of the regenerator, through cyclone type separator 12 and out to a precipitator or stack, through conduit 13, the residual suspended catalyst separated in the cyclone separator falling back into the regenerator.

The regenerated catalyst is withdrawn from the relatively dense fluidized bed of catalyst in the regenerator and passes downwardly therefrom through the regenerated catalyst leg 14, advantageously of sufficient length effectively to seal the conduit against the upward passage of gas into the regenerator and in which there is interposed a conventional valve arrangement 15 for controlling the flow of catalyst from the regenerator. The regenerated catalyst passes from the leg 14 into the lower end of conduit 2 where it is picked up by the oil charge and returned to the reactor.

The novel characteristics of my stripping column 7 appear more clearly from Figs. 2, 3 and 4 of the drawings. In the modification shown in Fig. 2, the stripping column is divided into a plurality of zones 16 by inclined baffles or plates 17, more clearly shown in Fig. 3 of the drawing. These plates advantageously extend entirely across the column 7. The upper portion of the plates is perforated as shown at 18, the lower portion of the plates being imperforate. Extending downwardly from the lower imperforated portion of the plates, are standpipes 19. Inlet pipes 20, for the injection of steam or other stripping medium, extend through the wall of the column and terminate at a point just beneath the lower ends of the respective standpipes, and are directed across the lower end of the standpipe towards the vertical axis of the stripping column. The plates 17 are so arranged in the column that alternate plates are inclined in opposite direction. In the arrangement shown in Fig. 2 and Fig. 3, the standpipe 19 extends downwardly through the zone immediately below the plate into the next lower zone. In this arrangement, the plate 17 is provided with an opening 21 through which the standpipe 19 passes. In the arrangement shown in Fig. 4, an upper zone is connected by the standpipe to the zone immediately below it and, in that arrangement, the openings 21 in plates 17 are omitted.

In operation, the spent catalyst passes from the reactor into the upper zone of the stripper column and is met by a countercurrent flow of steam passing upwardly through perforations 18. The catalyst settles on the plate, is kept fluidized by steam passing through the perforated portion of the plate and flows along the plate and downwardly through the standpipe 19. On passing from the lower end of the standpipe, the catalyst is picked up by the relatively high pressure stream of steam entering through 20 and a portion of the catalyst is carried along with the steam through perforations in the next higher plate into the zone above, where a major part of the catalyst is reprecipitated and from which a portion of the catalyst is carried into the next higher zone through the perforations 18. A further portion of the catalyst drops out of suspension into the zone in which the standpipe 19 terminates and is caught up by steam passing upwardly through the perforations in the next lower plate. This operation is repeated a number of times as the catalyst flows downwardly through the stripper column.

The perforations in plate 17 are, with advantage, of such size and are so spaced as to cause a small pressure drop and to fluidize the catalyst flowing across the plate. Advantageously, the length of the standpipe 19 is such as to balance, approximately, the pressure drop in the current of steam in flowing through the perforated plates from the zone in which the standpipe terminates to the zone at the upper end of the standpipe. A relatively slow flow of the catalyst downwardly through the standpipe is thus attained.

The modification, shown in Fig. 4 of the drawings, is substantially identical with that shown in Fig. 2 except that alternate plates are omitted.

The catalyst employed may be of the type conventionally used in fluid catalyst processes, for instance, a silica-alumina type catalyst in finely divided or powdered form. The reaction conditions may likewise be those conventionally used in operations of this type, and, as understood by the art, the optimum temperatures and pressures will depend primarily upon the type of feed stock used, the particular catalyst employed, and the reaction desired. In cracking gas oil, for instance, the reaction temperature may, with advantage, be within the range of 800 to 1,000° F. and the pressure at the top of the reactor within the range of about 5 to 25 pounds per square inch. The regeneration temperature may be within the range of 950° to 1,200° F., heat for the reaction being supplied largely by the hot catalyst passing to the charge oil from the regenerator.

It will be understood that the present invention is not restricted to the particular embodiment thereof herein described but is applicable to various modifications of fluid catalyst processes.

I claim:

1. A stripper for recovery from a finely divided solid catalyst the vaporizable hydrocarbons absorbed therein comprising an enclosed elongated vertical chamber divided into a plurality of vertically disposed communicating zones by partitions alternately inclined in opposite directions, the partitions being perforated at their respective upper portions and imperforate at their lower portion, substantially vertical standpipes connecting the lower portion of each of the zones, except the lowermost zone, with a lower zone of the stripper, inlet conduits positioned at the lower end of the respective standpipes and so constructed and arranged as to direct a gaseous stream substantially horizontal across the lower end of the respective standpipes in a direction toward the vertical axis of the stripper and an outlet for the stripped catalyst from the lowermost zone.

2. In the fluid catalyst process for the conversion of hydrocarbons wherein a finely divided catalyst suspended in charge oil is passed to a reaction zone, spent catalyst from the reaction zone is stripped of oil, regenerated by decarbonizing the catalyst, and the regenerated catalyst returned to the reaction zone, the improvement which comprises stripping the oil from the spent catalyst by passing the catalyst downwardly through an enclosed vertical elongated stripping chamber consisting of a plurality of successive communicating zones, passing the catalyst from each zone, except the lowermost zone, to a lower zone as a dense phase fluidized body, resuspending the catalyst as it enters each lower zone in a current of fresh steam directed transversely across the stream of catalyst as it enters said lower zone, returning a portion of the catalyst in suspension in the steam in the form of a plurality of divided catalyst streams to a higher zone and withdrawing stripped catalyst from the lowermost zone of the stripped chamber.

3. In the fluid catalyst process for the conversion of hydrocarbons wherein a finely divided catalyst suspended in charge oil is passed to a reaction zone, spent catalyst from the reaction zone is stripped of oil, regenerated by decarbonizing the catalyst, and the regenerated catalyst returned to the reaction zone, the improvement which comprises stripping the oil from the spent catalyst by passing the catalyst downwardly through an enclosed vertical elongated stripping chamber consisting of a plurality of successive communicating zones, maintaining each zone, except the uppermost, only partially filled with a dense phase fluidized bed of the catalyst, passing the catalyst from each zone, except the lowermost zone, to point in a lower zone above the dense phase bed of catalyst therein, resuspending the catalyst as it enters each lower zone in a stream of fresh steam, returning a portion of the catalyst in suspension in the steam to a higher zone and withdrawing stripped catalyst from the lowermost zone of the stripping chamber.

4. In the fluid catalyst process for the conversion of hydrocarbons wherein a finely divided catalyst suspended in charge oil is passed to a reaction zone, spent catalyst from the reaction zone is stripped of oil, regenerated by decarbonizing the catalyst, and the regenerated catalyst returned to the reaction zone, the improvement which comprises stripping the oil from the spent catalyst by passing the catalyst downwardly through an enclosed vertical elongated stripping chamber consisting of a plurality of successive communicating zones, maintaining each zone, except the uppermost, only partially filled with a dense phase fluidized bed of the catalyst, passing the catalyst from each zone, except the lowermost zone, to a point in a lower zone above the dense phase bed of catalyst therein, resuspending the catalyst as it enters each lower zone in a stream of fresh steam directed transversely across the stream of catalyst as it enters said lower zone, returning a portion of the catalyst in suspension in the steam to a higher zone and withdrawing stripped catalyst from the lowermost zone of the stripping chamber.

5. In the fluid catalyst process for the conversion of hydrocarbons wherein a finely divided catalyst suspended in charge oil is passed to a reaction zone, spent catalyst from the reaction zone is stripped of oil, regenerated by decarbonizing the catalyst, and the regenerated catalyst returned to the reaction zone, the improvement which comprises stripping the oil from the spent catalyst by passing the catalyst downwardly through an enclosed vertical elongated stripping chamber consisting of a plurality of successive communicating zones, passing the catalyst from each zone, except the lowermost zone, to a lower zone as a dense phase fluidized body, resuspending the catalyst as it enters each lower zone in a current of fresh gaseous stripping medium directed transversely across the stream of catalyst as it enters said lower zone, returning a portion of the catalyst in suspension in the gaseous stripping medium in the form of a plurality of divided catalyst streams to a higher zone and withdrawing stripped catalyst from the lowermost zone of the stripped chamber.

6. In the fluid catalyst process for the conversion of hydrocarbons wherein a finely divided catalyst suspended in charge oil is passed to a reaction zone, spent catalyst from the reaction zone is stripped of oil, regenerated by decarbonizing the catalyst, and the regenerated catalyst returned to the reaction zone, the improvement which comprises stripping the oil from the spent catalyst by passing the catalyst downwardly through an enclosed vertical elongated stripping chamber consisting of a plurality of successive communicating zones, maintaining each zone, except the uppermost, only partially filled with a dense phase fluidized bed of the catalyst, passing the catalyst from each zone, except the lowermost zone, to a point in a lower zone above the dense phase bed of catalyst therein, resuspending the catalyst as it enters each lower zone in a stream of fresh gaseous stripping medium, returning a portion of the catalyst in suspension in the gaseous stripping medium to a higher zone and withdrawing stripped catalyst from the lowermost zone of the stripping chamber.

7. In the fluid catalyst process for the conversion of hydrocarbons wherein a finely divided catalyst suspended in charge oil is passed to a reaction zone, spent catalyst from the reaction zone is stripped of oil, regenerated by decarbonizing the catalyst, and the regenerated catalyst returned to the reaction zone, the improvement which comprises stripping the oil from the spent catalyst by passing the catalyst downwardly through an enclosed vertical elongated stripping chamber consisting of a plurality of successive communicating zones, maintaining each zone, except the uppermost, only partially filled with a dense phase fluidized bed of the catalyst, passing the catalyst from each zone, except the lowermost zone, to a point in a lower zone above the dense phase bed of catalyst therein, resuspending the catalyst as it enters each lower zone in a stream of fresh gaseous stripping medium directed transversely across the stream of catalyst as it enters said lower zone, returning a portion of the catalyst in suspension in the gaseous stripping medium to a higher zone and withdrawing stripped catalyst from the lowermost zone of the stripping chamber.

MARION J. WILCOX.

REFERENCES CITED

The following references are of record in the file of this patent:

UNITED STATES PATENTS

| Number | Name | Date |
|---|---|---|
| 2,316,664 | Brassert et al. | Apr. 13, 1943 |
| 2,367,694 | Snuggs | Jan. 23, 1945 |
| 2,387,309 | Sweeney | Oct. 23, 1945 |
| 2,391,944 | Carlsmith | Jan. 1, 1946 |
| 2,451,619 | Hengstebeck et al. | Oct. 19, 1948 |
| 2,490,993 | Borcherding | Dec. 13, 1949 |